United States Patent [19]

Harris et al.

[11] Patent Number: 4,461,846

[45] Date of Patent: Jul. 24, 1984

[54] CATALYST DISPERSION HAVING IMPROVED STABILITY AGAINST PHASE SEPARATION

[75] Inventors: James J. Harris; Donald E. Hostetler; G. Stanley Achorn, all of West Chester, Pa.

[73] Assignee: National Distillers and Chemical Corporation, New York, N.Y.

[21] Appl. No.: 479,637

[22] Filed: Mar. 28, 1983

[51] Int. Cl.$^3$ ................................................. C08F 4/64
[52] U.S. Cl. ..................... 502/105; 502/110; 502/132; 502/108; 526/125
[58] Field of Search ................ 502/105, 108, 110, 132

[56] References Cited

U.S. PATENT DOCUMENTS

| 3,445,443 | 5/1969 | Sasaki et al. | 502/110 X |
| 3,784,539 | 1/1974 | Ort | 502/110 X |
| 4,086,185 | 4/1978 | Shirai et al. | 502/105 |
| 4,287,328 | 9/1981 | Kikuta et al. | 502/108 X |

Primary Examiner—Patrick Garvin
Attorney, Agent, or Firm—Kenneth D. Tremain

[57] ABSTRACT

Catalysts for the polymerization of ethylene or its copolymerization with $C_3$-$C_2$ alpha-monoolefins are often pre-activated by polymerizing a small amount of $C_4$-$C_{12}$ alpha-monoolefin onto the catalyst in the presence of an alkyl aluminum compound. The resultant pre-activated catalyst component is used in the form of a dispersion in an inert solvent. The dispersions have a tendency to separate into two phases rapidly and are thus difficult to add uniformly to a polymerization reaction. When the alkyl aluminum compound is replaced by a synergistic mixture of an alkyl aluminum choride and an oxygen-containing aluminum compound having oxygen attached to at least one aluminum valence, a stable dispersion is formed which will not separate into two phases for long periods of time.

4 Claims, No Drawings

CATALYST DISPERSION HAVING IMPROVED STABILITY AGAINST PHASE SEPARATION

BACKGROUND OF THE INVENTION

The invention relates to a method of stabilizing a Ziegler catalyst component to prevent separation of the catalyst from the dispersing solvent for times sufficient to allow utilization of the catalyst dispersion prior to said separation.

Shirai et al, U.S. Pat. No. 4,086,185, teaches to pre-activate a titanium trichloride catalyst component by polymerizing a small amount of propylene onto the catalyst. A stable dispersion of the pre-activated catalyst in an inert solvent is formed. The resulting dispersion is useful to prepare polypropylene having reduced amounts of atactic polypropylene.

Kikuta et al, U.S. Pat. No. 4,287,328, teaches to pre-activate a catalyst for the polymerization of a propylene by pre-polymerizing a small amount of alpha-monoolefin onto the catalyst in the presence of an organoaluminum compound. The pre-activated catalyst had greater stability as measured by catalyst activity, crystallinity of the polypropylene, and the resultant shape of the polypropylene particles formed.

In copending application Ser. No. 454,224, filed Dec. 29, 1982, we described a catalyst for the preparation of low density polyethylene. The catalyst could be pre-activated by polymerizing a small amount of alpha-monoolefin on the catalyst in the presence of a single alkyl aluminum compound.

All of the above references have the disadvantage that a dispersion of catalyst in inert solvent must be constantly agitated while being added to a polymerization reactor along with monomers and co-catalysts. Without the agitation, the dispersions tend to rapidly separate into catalyst and supernatant solvent. The separation causes variation in catalyst concentration and difficulty in feeding the dispersion to a reactor.

SUMMARY OF THE INVENTION

We have now found that catalyst dispersions stable to phase separation can be prepared by pre-activation of the catalyst with an alpha-monoolefin having 4 to 10 carbon atoms in the presence of a synergistic mixture of an alkyl aluminum chloride and an oxygen-containing aluminum compound having oxygen attached to at least one aluminum valence. When pre-activated with this co-catalyst mixture, the catalyst forms dispersions which do not separate into the solid and supernatant liquid phases for periods of time greater than 48 hours without additional agitation.

DETAILED DESCRIPTION OF THE INVENTION

This invention comprises a method of preparing pre-activated catalyst dispersions which are extremely stable to phase separation and can be used in conjuction with a co-catalyst to polymerize ethylene alone or in combination with other alpha-monoolefin to form high polymers.

The catalyst is prepared by co-comminuting a magnesium halide, an aluminum halide, a titanium compound and optionally in the presence of at least one electron donor. The co-comminution is carried out preferably in a ball mill or vibration mill.

The magnesium halide is chosen from the chlorides, bromides and fluorides, with magnesium chloride being preferred. The magnesium compound must be anhydrous. Anhydrous magnesium chloride may be prepared by any of the known methods in the art. For example, it may be made by adding anhydrous HCl to an organomagnesium compound or by drying commercial $MgCl_2$ by heating to 350° C. in a stream of anhydrous HCl.

The aluminum halide is also chosen from the chlorides, bromides and fluorides.

The titanium compound may be halides, oxyhalides, alcoholates such as the titanates of aliphatic alcohols having 1 to 6 carbon atoms in the alkyl groups, acetates, benzoates, acetylacetonates and the dicyclopentadienyl salts. Especially useful are the halides such as titanium tetrachloride.

The electron donors are preferably aromatic ethers, such as anisole, or alkyl esters of aromatic acids, such as ethyl benzoate or ethyl p-toluate.

The preferred catalyst in this invention is made by first co-comminuting magnesium chloride, aluminum chloride and anisole followed by co-comminuting the above mixture further with a complex of titanium tetrachloride and ethyl benzoate. The ratio of Mg:Al is preferably between 2:1 and 16:1. The ratio of Mg:anisole is preferably between 2:1 and 16:1, also. The ratio of Mg:Ti is preferably between 8:1 and 80:1. The second electron donor should be used in essentially the same ratios as the anisole is used. Of course, the second electron donor may be anisole also, but it is preferably ethyl benzoate.

The ball milling of the magnesium halide, aluminum halide and the anisole is carried out under an inert atmosphere at temperatures between 0° C. and 90° C. for a time between 15 minutes and 48 hours.

The product of the first ball milling is then combined with the complex of titanium compound with a second electron donor and the whole ball milled under an inert atmosphere at a temperature between 0° C. and 90° C. for a time between 15 minutes and 48 hours.

Although it is preferred that all the above ingredients be ball milled in the absence of a solvent, a small amount of an inert solvent may be added and further ball milled to provide a uniformly disperse catalyst. Such inert solvents may be n-heptane, mineral spirits, and the like.

In some uses the catalyst so produced has a disadvantage in that the dispersion of catalyst in inert solvent quickly separates on standing. This may make metering the catalyst, into a polymerization reactor difficult unless some means of continuously mixing the dispersion is used.

It is known to further disperse the catalyst by adding a small amount of an alpha-monoolefin having 4 to 12 carbon atoms which will give a soluble polymer. A preferred olefin is 1-octene. This so-called "pre-activation" of the catalyst actually polymerizes the monomer onto the surface of the catalyst to form a soluble polymer thereon. The pre-activation is carried out in the presence of a small amount of alkyl aluminum compounded as co-catalyst, which may be the same co-catalyst to be used later in the intended polymerization. The pre-activated catalyst is a more stable dispersion. It will settle more slowly and can be metered more efficiently than the initial catalyst dispersion. Pre-activation of the catalyst may also increase the catalyst efficiency with regard to polymer yield per gram of catalyst.

Even the pre-activation as known, gives catalyst dispersions which separate into the two phases more quickly than desirable.

We have now found that by replacement of the single alkyl aluminum compound as co-catalyst in the pre-activation step with a synergistic mixture of between 40 to 80 mole percent of an alkyl aluminum chloride and 20 to 60 mole percent of an oxygen-containing aluminum compound having oxygen attached to at least one aluminum valence, the pre-activated catalyst component forms with the inert solvent an extremely stable dispersion which will not separate into catalyst component and supernatant solvent in the normal times required to utilize the dispersion in the polymerization of ethylene or its copolymerization with alpha-monoolefins having 3 to 20 carbon atoms.

The oxygen-containing aluminum compounds alone give essentially no polymer during the pre-activation procedure. The alkyl aluminum chlorides alone give less stable pre-activated catalyst dispersion. The alkyl aluminum chloride is selected from dialkyl aluminum chloride, alkyl aluminum dichloride, and mixtures of these. The oxygen-containing aluminum compound may be aluminum oxide, but is preferably an alkyl aluminum compound such as dialkyl aluminum alkoxide, alkyl aluminum dialkoxide, aluminum trialkoxide, or the various aluminoxanes, such as tetraalkyldialuminoxane, pentaalkyltrialuminoxane and hexaalkyltetraaluminoxane. In all cases, the "alkyl" refers to linear, or branched, or cyclic alkyl groups having 1 to 10 carbon atoms in the group.

The pre-activated catalyst thus produced is used in conjunction with a cocatalyst comprising an alkylaluminum compound selected from the group consisting of trialkyl aluminum, dialkyl aluminum halide, and dialkyl aluminum hydride. The alkyl groups may contain at least 1 carbon atom and preferably not more than 12 carbon atoms. Those containing more than 12 carbon atoms are less available and economically unattractive. The cocatalyst is used generally in ratios from 1:1 to 100:1 based on the titanium content of the catalyst.

The ethylene polymers and copolymers are preferably prepared by polymerization at temperatures between 140° and 300° C. and at pressures up to 50,000 psig. At lower pressures (to 5000–10,000 psig) it may be desirable to use an inert solvent to dissolve the polymer giving a solution polymerization. In some cases the comonomer will serve this function and additional solvent is not needed. The inert solvent suitable for such use may be inactive hydrocarbon such as isobutane, butane, pentane, hexane, n-heptane, cycolhexane, or mineral spirits. At higher pressures the alpha-olefin/ethylene mixture will generally suffice as the polymerizing medium even with a low molecular weight comonomer such as butene-1. It is especially advantageous to run the polymerizations in the absence of solvent since removal of solvent will not be required.

The following examples are intended to further illustrate, but not to limit the scope of the instant invention.

EXAMPLE I

To illustrate the invention, the following experiment is run.

a. Catalyst Preparation

Magnesium chloride is dried by heating it to 365° C. while anhydrous HCl is passed over it. The anhydrous $MgCl_2$ thus formed (40 g) is charged in Argon to a ball mill containing 316 stainless steel balls with 7.0 g. anhydrous $AlCl_3$ and 11.0 g anisole. The mixture is ball milled for 30 hours and then 10 g of a preformed titanium tetrachloride-ethyl benzoate complex, $TiCl_4$/EB, in 10 g hexane is added. Ball milling is continued an additional 24 hours under a blanket of Argon. Then 50 ml. additional hexane is added and the mixture is ball milled for 6 hours to produce a slurry which is readily dispersible. The mixture is further diluted with mineral spirits to the desired concentration for use in the subsequent polymerizations.

b. Pre-activation of the catalyst

A portion of the catalyst from part (a) containing 0.919 millimoles (mm) Ti in 20 ml. of mineral spirits (Exxon Isopar H) is added to a 100 ml. Diels-Alder pressure tube under nitrogen and then sealed with a perforated bottle cap having a neoprene rubber liner. To this is charged by syringe with stirring (magnetic stirrer) 0.9 mm of a 2/1 mixture of diethyl aluminum chloride (DEAC) and diethyl aluminum ethoxide (DEAEO) and 4.9 ml. of octene-1 (80 g octene-1/g Ti). Within 15 minutes the viscosity in the tube begins to increase and within one hour is about as viscous as mineral oil (Nujol). The viscosity increases further to give a syrupy consistency which holds the catalyst dispersion without settling for extended periods of time. Thus, no clear supernatant liquid is observed after standing for 48 hours and, even after 120 hours only 5–10% clear supernatant liquid is observed.

Similar settling time studies on the un-preactivated catalyst dispersion from part (a) above shows 50% clear, supernatant liquid after only 45 seconds and 100% within 3 minutes.

c. Preparation of Polyethylene

A one gallon stirred autoclave jacketed with a circulating oil bath is charged with 1.9 liters of mineral spirits (Exxon Isopar H) under a blanket of nitrogen. The contents are then heated to 254° C. and the reactor is charged to 530 psig with ethylene.

A 2.0 ml. sample of the catalyst, from part (a) containing 0.06 mm of titanium and 0.8 mm trioctyl aluminum (TOA) are mixed in a 20 ml. catalyst tube and flushed into the reactor with 200 ml. of Isopar H (preheated to 150° C.). Polymerization begins immediately. After 40 seconds at the desired polymerization temperature the reactor contents are discharged into a vessel containing 1 liter of isopropyl alcohol at atmospheric pressure. The resulting slurry is cooled to below 50° C. and filtered. The filter cake is mixed with acetone in a Waring blender, filtered and than vacuum dried at constant weight. The polymer yield is 99.5 g (34,600 g. PE/g Ti). The polymer melt index (ASTM-D1238) is 7.44 and the density is 0.964 g/cc.

d. Preparation of Ethylene Copolymer

A one-gallon stirred autoclave jacketed with a circulating oil bath is charged with 1.6 liters of mineral spirits (Exxon Isopar H) and 350 ml. of octene-1 comonomer under a blanket of nitrogen. The contents are then heated to 245° C. and the reactor is charged to 580 psig with ethylene.

A 2.0 ml. sample of the catalyst, from part (a) containing 0.06 mm of titanium and 0.8 mm trioctyl aluminum are mixed in a 20 ml. catalyst tube and flushed into the reactor with 200 ml. of Isopar H (preheated to 150° C.). Polymerization begins immediately. After 40 seconds at the desired polymerization temperature the reactor contents are discharged into a vessel containing 1 l. of isopropyl alcohol at atmospheric pressure. The resulting slurry is cooled to below 50° C. and filtered. The filter cake is mixed with acetone in a Waring blender, filtered and then vacuum dried to constant weight. There is obtained 62.0 g copolymer (21,800 g PE/g Ti). The copolymer has a melt index of 23.0 and a density of 0.918 g/cc.

EXAMPLE II

To illustrate the invention further, the following is run: The catalyst is prepared exactly as in Experiment Ia. The pre-activation of the catalyst is carried out as in Ib, with the exception that the co-catalyst for the pre-activation step is varied as shown in Table I. In the case of the synergistic mixture of cocatalysts the ratio Al/Ti is the ratio of total Al in the cocatalyst to the Ti from the catalyst from part (a). The pre-activated catalyst dispersions are stirred for 24 hours and then allowed to stand and the rate of settling measured by the percent of clear supernatant liquid formed after the times specified. Results are shown in Table I. TOA is trioctyl aluminum, DEAC and DEAEO are as designated in Example I.

TABLE I

| Time minutes | Percent Supernatent Liquid Cocatalyst | | | | | |
|---|---|---|---|---|---|---|
| | TOA 1/1 Al/Ti | DEAC 1/1 Al/Ti | DEAEO 1/1 Al/Ti | DEAEO 2/1 Al/Ti | DEAC/DEAEO 1/1 Al/Ti | DEAC/DEAEO 2/1 Al/Ti |
| 5 | 37.5 | 12.5 | 55.2 | 47.4 | 0 | 0 |
| 30 | 62.0 | 44.0 | 73.0 | 68.0 | 0 | 0 |
| 200 | 69.0 | 58.0 | 90.0 | 89.5 | 0 | 0 |
| 7200 | — | — | — | — | 8.7 | 10.7 |
| 14400 | — | — | — | — | 26.0 | 30.0 |

EXAMPLE III

The procedure of Example II is repeated substituting hexaisobutyltetraaluminoxane (HBTAO) for the diethyl aluminum ethoxide. Results are shown in Table II.

TABLE II

| Time minutes | Percent Supernatant Liquid Cocatalyst | | | |
|---|---|---|---|---|
| | DEAC 1/1 Al/Ti | HBTAO 2/1 Al/Ti | DEAC/HBTAO 1/1 Al/Ti | (3/2) 2/1 Al/Ti |
| 5 | 12.5 | 47.4 | 21.0(1.0)* | 0 |
| 30 | 44.0 | 72.0 | 80.0(5.2)* | 0 |
| 200 | 58.0 | 90.0 | 89.5(42.2)* | 0 |
| 1230 | — | 92.2 | 90.0(76.5)* | 0 |
| 3540 | — | 92.2 | 91.0(—)* | 0 |

*The number in parentheses is measured after 48 hours and indicates that the rate of polymerization of the octene on the catalyst was slower with this co-catalyst combination at 1/1 ratios of Al/Ti than in the case of DEAEO in Example II.

EXAMPLE IV

To illustrate that the oxygen-containing aluminum compounds of the present invention may be aluminum oxide, Al₂O₃, the process of Example II is repeated substituting Al₂O₃ for the aluminoxane. Results are shown in Table III.

TABLE III

| Time minutes | Percent Supernatent Liquid Cocatalyst | | | |
|---|---|---|---|---|
| | DEAC 1/1 Al/Ti | Al₂O₃ 2/1 Al/Ti | DEAC/Al₂O₃(17/1) 2/1 Al/Ti | DEAC/Al₂O₃(8/1) 2/1 Al/Ti |
| 30 | 44.0 | 92.2 | 0 | 0 |
| 200 | 58.0 | 92.2 | 0 | 0 |
| 500 | — | — | 0 | 0 |
| 1440 | — | — | 0 | 0 |

Because of the lack of alkyl groups on the Al₂O₃, the dispersion of DEAC with Al₂O₃ is difficult. The resultant dispersion settles fairly slowly and is more readily redispersed than the original mixture. As is plain from the data in the Table, the pre-activated catalyst made with the DEAC/Al₂O₃ mixture is extremely stable toward separation on standing.

What is claimed is:

1. In a process for forming a pre-activated catalyst component comprising:
   (a) co-comminuting a magnesium halide, an aluminum halide, a titanium compound, optionally in the presence of at least one electron donor, and
   (b) reacting the catalyst component from (a) with a small amount of an alpha-monoolefin having 4 to 12 carbon atoms in the presence of an alkyl aluminum compound to produce low molecular weight poly alpha-monoolefin on the catalyst component, the improvement comprising using for said alkyl aluminum compound in (b) a synergistic mixture of between 40 to 80 mole percent of an alkyl aluminum chloride and 20 to 60 mole percent of an oxygen-containing aluminum compound having oxygen attached to at least one aluminum valence, whereby said catalyst component and said inert solvent forms an extremely stable dispersion which will not separate into catalyst component and supernatant solvent in the normal times required to utilize the dispersion in the polymerization of ethylene or its copolymerization with alpha-monoolefins having 3 to 20 carbon atoms.

2. The process of claim 1 wherein said alkyl aluminum chloride is selected from the group consisting of alkyl aluminum dichloride, dialkyl aluminum chloride, and mixtures thereof wherein each alkyl refers to linear, branched, or cyclic alkyl groups having 1 to 10 carbon atoms in the group.

3. The process of claim 1 wherein said oxygen-containing aluminum compound is selected from the group consisting of aluminum oxide, alkyl aluminum dialkoxide, dialkyl aluminum alkoxide, aluminum trialkoxide, tetraalkyldialuminoxane, pentaalkyltrialuminoxane, and hexaalkyltetraaluminoxane, wherein each alkyl refers to linear, branched, or cyclic alkyl groups having 1 to 10 carbon atoms in the group.

4. In a process for forming a pre-activated catalyst component comprising:
  (a) co-comminuting a mixture of an anhydrous magnesium halide, anhydrous aluminum halide and a first electron donor, and
  (b) co-comminuting the mixture from (a) with a complex of titanium halide and a second electron donor, which may be different from or the same as said first electron donor; said co-comminuting being carried out under an inert atmosphere in the presence of an inert solvent, and
  (c) reacting the catalyst component from (b) with a small amount of an alpha-monoolefin having 4 to 12 carbon atoms in the presence of an alkyl aluminum compound to produce a low molecular weight polyalpha-monoolefin on the catalyst component, the improvement comprising using for said alkyl aluminum compound in (c) a synergistic mixture of between 40 to 80 mole percent of an alkyl aluminum chloride and 20 to 60 mole percent of an oxygen-containing aluminum compound having oxygen attached to at least one aluminum valence, whereby said catalyst component and said inert solvent forms an extremely stable dispersion which will not separate into catalyst component and supernatant solvent in the normal times required to utilize the dispersion in the polymerization of ethylene or its copolymerization with alpha-monoolefins having 3 to 20 carbon atoms.

* * * * *